United States Patent [19]

Pietrantonio et al.

[11] Patent Number: 4,858,086
[45] Date of Patent: Aug. 15, 1989

[54] INTERNAL ILLUMINATED DECORATIVE DISPLAYS

[76] Inventors: Michael Pietrantonio, 7725 Dollier Street, St-Leonard, Quebec, Canada, H1S 2K1; Giuseppe De Frenza, 7722 Dollier Street, St-Leonard, Quebec, Canada, H1S 2J9

[21] Appl. No.: 62,639
[22] Filed: Jun. 16, 1987

[30] Foreign Application Priority Data

Nov. 26, 1986 [CA] Canada .................................. 523807

[51] Int. Cl.⁴ .............................................. F21P 1/02
[52] U.S. Cl. ...................................... 362/123; 362/32; 362/122; 362/806
[58] Field of Search .................. 362/32, 122, 123, 806

[56] References Cited

U.S. PATENT DOCUMENTS 3,535,018 10/1970 Vasilatos .......................... 362/32 X
3,564,233  2/1971 Cox et al. ......................... 362/32 X
3,943,815  3/1976 Gilbert ............................. 362/32 X
4,060,722 11/1977 Foley ................................. 362/32
4,068,118  1/1978 Carrington ......................... 362/123
4,364,102 12/1982 Happert et al. .................... 362/123
4,394,714  7/1983 Rote ................................... 362/32

FOREIGN PATENT DOCUMENTS 69977 1/1983 European Pat. Off. .............. 362/32

Primary Examiner—Tony M. Argenbright
Assistant Examiner—Eric R. Carlberg
Attorney, Agent, or Firm—Samuel Meerkreebs

[57] ABSTRACT

Illuminated decorative displays utilizing fiber optics are presented. The decorative displays are in the form of Christmas season ornaments such as wreaths, Christmas trees, and outdoor lighting series. The simulation of light bulbs is achieved by transmitting light through a solid light conducting medium. In the case of the Christmas tree, a cast solid medium in the form of a coniferous branch is used. In the case of the wreath, either a solid light conductive medium cast in an annular shape, or a hollow annular chamber with perforations filled with optical fiber material is used. In the case of the lighting series, either a long case rod with protrusions, single or bundled group of optical cable is used.

11 Claims, 3 Drawing Sheets

INTERNAL ILLUMINATED DECORATIVE DISPLAYS

BACKGROUND OF THE INVENTION

1. Field of the Invention

The present invention relates to internally lighted decorative displays, and in particular, in the use of a light conducting medium to replace a plurality of light bulbs in decorative displays, such as Christmas trees, wreaths, or outdoor series lights.

2. Description of the Prior Art

Through the course of the investigation, it has become apparent that in the past 20 years, several inventors have tried to develop alternate means of replacing light bulbs by the use of a light conductive medium material, such as fiber optics and/or hollow reflective transmission devices. The intent of utilizing the above was to innovate the principles of lighting effects, save on energy consumption by simulating the use of multiple light bulbs, reduce maintenance and risk of fire hazards. Furthermore, the use of optical fiber or light conducting medium would represent a complete innovation in the areas of ornamental or lighting displays, lamps and other areas of application. This concept has been applied to some decorative displays, such as Christmas trees and wreaths, as documented in U.S. Pat. No. 3,766,376 by Sadocca, U.S. Pat. No. 4,068,118 by Carrington, U.S. Pat. No. 3,465,139 by Mard Continental, and U.S. Pat. No. 4,364,102 by Huppert et al, etc.

Although the approaches taken in the above patents serve as good substitutes for the multiple use of light bulbs, they all do not take full advantage of optical fiber, light conducting medium and hollow transmission devices. This leads to a large waste and misuse of materials, volume, weight and cost. To be more specific, all the devices mentioned in the above patents, except for U.S. Pat. No. 4,364,102 to Huppert et al, are inefficient because they utilize a certain length of a light conducting medium to achieve a single pin-point of light for every strand of the light conducting medium used, thereby restricting the illumination to the extreme end of a Christmas tree branch. In U.S. Pat. No. 4,364,102 by Huppert et al, a different approach is taken, that is, of using hollow transmission with a reflective chamber. In this case, a constant light intensity cannot practically be kept constant since, based on the geometry and size of the branch, the light intensity decreases as the square of the distance from the source.

Therefore, these systems do not take full advantage of the illuminating effects provided by optical fiber or light conducting medium and hollow transmission, inasmuch as they do not provide neither a spray of optical fiber nor a multiplicity of simple pin-point like lights. Attempts have been made to provide such an effect on a Christmas tree, such as U.S. Pat. No. 3,624,385, but the process and materials used are too cumbersome, costly and still do not exploit the complete significance of fiber optics and/or light conducting materials.

SUMMARY OF THE INVENTION

It is an aim of the present invention to provide a more efficient internally illuminated display utilizing a solid light conducting medium or a hollow transmission device for use in Christmas trees, wreaths or other outdoor series lights or a combination thereof which is more efficient than that presently available.

It is a further aim of the present invention to provide a Christmas tree construction whereby the needles on the respective branches of the Christmas tree are illuminated as well as the ends of the branches.

It is a further aim of the present invention to provide an illuminated Christmas wreath utilizing one or two light sources in combination with light conducting solid medium materials or hollow light transmission devices which provide a multiple light emitting location on the wreath.

It is a further aim of the present invention to provide an outdoor series light construction using the above-mentioned devices.

It is a further aim of the present invention to provide improved control devices for providing intermittent illumination or varied colour illumination to the above-mentioned devices.

A construction in accordance with the present invention comprises an illuminated decorative display comprising at least a light source, and an opaque non-light-absorbing housing surrounding the light source, light conducting means having one end in close light conducting proximity to the light source. The display includes a plurality of spaced-apart light emitting locations, and the light conducting means are effective for propagating the light from the light source to the light emitting locations.

In a more specific embodiment of the present invention, the light conducting means is in the form of a solid, light conducting material. In a still more specific embodiment, the solid, light conducting material is cast organic material having a stem portion and branch portions cast with and extending from the stem portion in such a manner that the stem portion and branch portions transmit visible light to the ends of the branch portions and the stem portion thereby providing light emitting locations.

This invention provides illuminated displays, such as Christmas trees, wreaths, and outdoor or indoor decorative displays which are illuminated by the principle of cold light (i.e., fiber optics, light conducting materials and/or hollow transmission). Furthermore, this invention also was developed with the idea of improving product safety with the minimal use of electrical wire, power supply and light bulbs, and with reducing the cost and wastage of materials.

The artificial Christmas tree, which is illuminated by the conduction of light through a light conducting medium comprises a base which supports the hollow trunk containing an elongated light source, branches which are cast of a light conducting medium, a movable segment of the trunk which would facilitate the replacement of the light source and an annular rotating contact wheel to provide an on-off light effect, the wheel rotated by a motor inserted at the base, and a base that is easily accessible.

The artificial wreath illuminated by the transmission of light through a solid light conducting medium comprises two solid, light conducting medium semi-annular rings with a plurality of protrusions located in a hollow, opaque annular housing having apertures through which the protrusions extend, and the housing which is decorated to look like a wreath by the use of foliage, needles or flowers associated with the Christmas season.

The outdoor display unit illuminated by transmission through a solid light conducting medium comprises segments of a given length made of a solid light conducting medium containing a plurality of protrusions at uniform intervals; an apparatus at the end of each segment so as to allow attachments of these segments so as to enable extension of the unit; a sheath covering the segments to allow escape of light only where desired; a light box which will contain a light source and an apparatus involving a colour wheel which will allow the unit to change colours or achieve an on-off effect.

The outdoor display unit illuminated by optical fibers comprises a bundle of optical fibers of different lengths contained in a long tubular container, containing perforations to allow individual optical cables to exit the system; at the base of the display, a light box containing an incandescent light bulb and a colour wheel which will light up the unit and allow colour changes and on-off effects. The box also contains a wheel to provide a chasing effect created by the illusion of different segments of the display lighting at different intervals of time.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
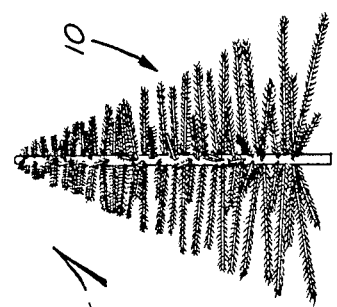
FIG. 1 is a perspective view of the optical display of the present invention in the form of a Christmas tree.
Figure 2:
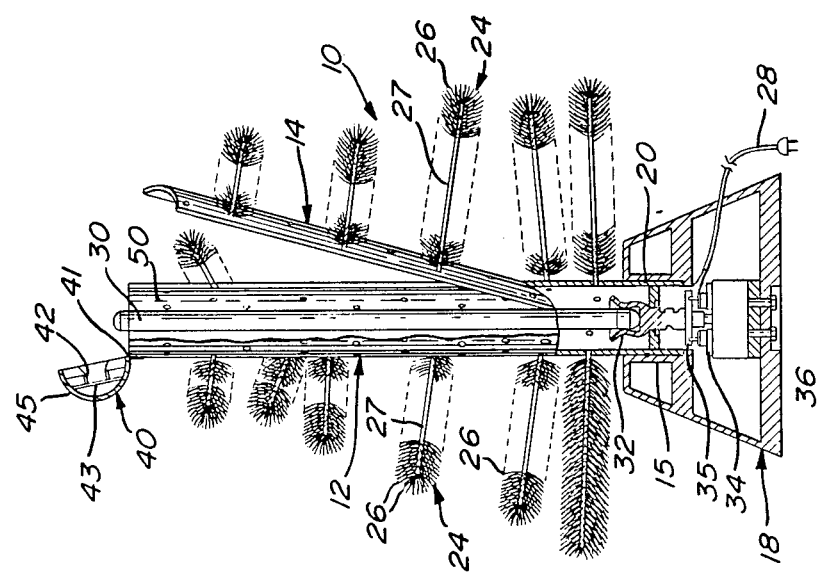
FIG. 2 is an enlarged partial cross-sectional view of the Christmas tree display of FIG. 1, illustrating the hollow trunk, internal light source of the display, light source socket, bearing, top and bottom contact wheel for on-off features, motor with speed control, on-off main line switch and an option button for permanent colour selection.

In FIG. 1, there is shown an internally lighted optical display of the present invention in the form of a Christmas tree 10. In FIG. 2, the tree 10 includes a 270° or ¾ tubular trunk segment 12 and a quarter trunk segment 14 secured by ring 15 at the bottom, attached to a base or stand 18. Trunk segments 12 and 14 are secured to stand 18 by means of snaps 20, which are forced against the trunk segments 12 and 14 and firmly support the tree display 10. The stand 18 could be cast of organic or inorganic materials. Inserted into each trunk segment 12 and 14 are a plurality of branches 24, each containing a plurality of needles 26. The stem and needles of the branch 24 are cast of solid, light conducting medium as a one-piece assembly. The solid, light conducting medium of the present embodiment may be cast of organic material such as, for example, opto-electronic liquid encapsulant material available from Hysol under the trade name OS-1000.

A tubular light 30, which illuminates the Christmas tree display 10, is connected to a snap-on spring socket 32 and thus to an electrical source through contact wheels 34 and 35 of various sizes for alternation of on-off cycles. The contact wheel 35 is connected to a rotating motor 36 of various options of no-rotation, slow speed or fast speed. Motor 36 is connected through a low voltage adaptor (not shown) and an electrical wire 28 to a household socket. The adaptor is usable with 117 and 208 voltage lines. The light emitted from the tubular light 30 is transmitted through to the periphery of the branch 24 and propagated by dispersive mode through the stem 27 and needles 26, and uniformly from the interior to the tips of needles 26.

The tubular light 30 communicates, at the top of the tree, with a contact cover 40, which can open and close. The contact cover 40 consists of a hinge 41 attached to the trunk segment 12, an electrical contact 42 which, when the said cover 40 is closed, makes contact with another electrical contact 43 located on the three quarter trunk segment 12. The contact 43 also serves for the purpose of holding the light source. The contact cover 40 also contains perforations 45 to allow for the insertion of a branch 26, not shown, or any other ornamental display.

The contact cover 40 also serves to hold the three quarter trunk segment 12 and one quarter segment 14, when tubular light 30 does not require replacement. Also the contact cover 40 serves as a pivot 41 for the rotation of the light tube when rotated by the motor 36.

The composition of the trunk segments 12 and 14 is of organic or inorganic material to enable the trunk to be molded into shape.

Figure 3:
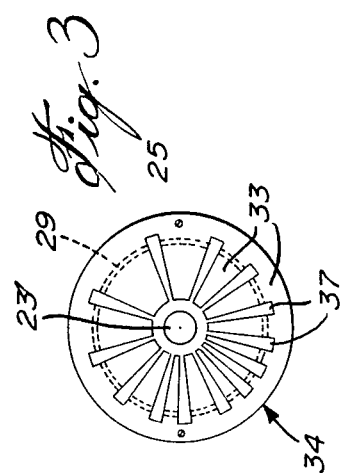
FIG. 3 is an enlarged view of the contact wheel displayed herein as one of the many possibilities of obtaining an on-off lighting effect. Also shown on the contact wheel are geometrical contact patterns of various sector sizes to provide different on-off durations of time.

Together, trunk segments 12 and 14 define an interior hollow space 50 as shown in FIG. 3. Within hollow space 50 is placed an elongated tubular light 30, incandescent or fluorescent. The trunk segments 12 and 14 may be coated internally by an inorganic shiny material or the shiny reflective material may be omitted by inserting the stem 27 of the branch 24 as close as possible to the light 30. The light source is then transmitted through the stem 27, branch 24, and needles 26. The light reflective layer can be readily placed by thin coating of spray paint, evaporation, eletrolytic plating, etc. Light source 30 may be pigmented to produce multicoloured effect on the exterior surface thereof.

FIG. 2 shows contact wheel 34, illustrating one of the many contact patterns which can be used for obtaining different on-off lighting effects. The contact pattern is comprised of conductive segments 33 and non-conductive segments 37. The conductive segment 33 is connected to the switch and motor by an electrical wire 28 which is held on the conductive segment 33 with a screw 25, which also anchors the contact wheel 34 to the motor. The contact wheel 34 is insulated from the motor to enable the prevention of any electrical shorts. The contact wheel 34 contains a hollow center 23 to allow the shaft 21 of the motor 36 to pass through. The said shaft 21 mates with the contact wheel 35. The contact wheel 35 is composed of a metal segment and includes a snap-on socket 32. The contact wheel 35 contains two small bearings which allow for continuity of electricity by making contact with the conductive segment 33 through the light source 30 through the contacts 42 and 43 of the contact cover 40, at which electricity flows through the switch 22 through the adaptor 38. FIG. 2 also shows a typical contact path 29 which the contact wheel 35 will follow when the said contact wheel 35 is rotated by motor 36.

Figure 4:
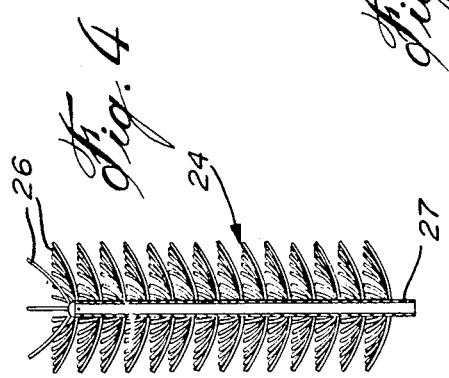
FIG. 4 is a transverse sectional view taken generally along a line 4—4 of FIG. 5 displaying a multiplicity of needles and diameter of stem comprising the branch.
Figure 5:
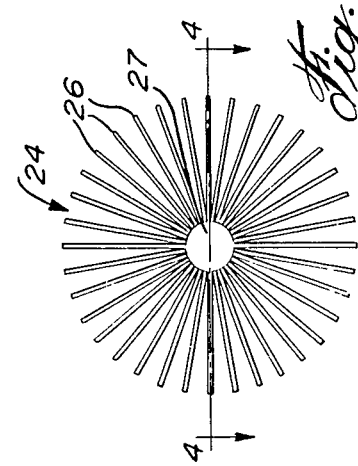
FIG. 5 is a cross-sectional view of a branch of the Christmas tree display illustrating the cast branch and needles as a one piece assembly.

Referring to FIGS. 4 and 5, it can be seen that each branch 24 defines a multiplicity of needles. Any desired number of needles may be obtained to enhance the appearance of the tree 10 by a casting process. The branch 24 is obtained by casting, with light conducting material, preferably having a single index of refraction to produce uniform scattering of light. Needles 26 of the tree display 10 simulate the needles of an evergreen. The colour of the tree 10 and branches 24 may be produced in various colours, such as white, blue, etc.

Figure 6:
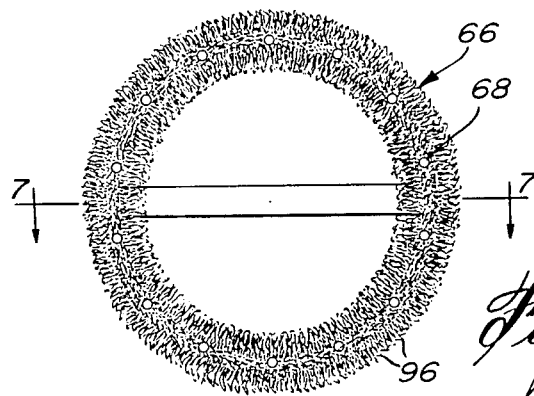
FIG. 6 is an elevational view of an alternative form of the optical display of the present invention in which the display is in the form of a wreath.
Figure 7:
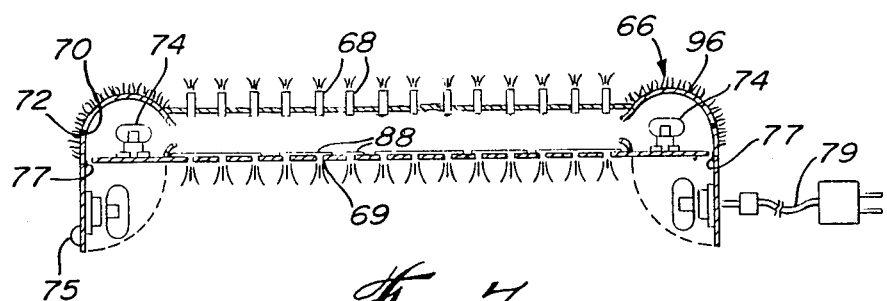
FIG. 7 is a sectional view of the wreath display taken generally along the line 7—7 of FIG. 6, also indicated is the method of removal of the light bulbs for replacement. Alpha-numerical optical display either comprised of single solid fiber covered with various translucent coloured material, or alpha-numeric composed of perforated holes and each alpha-numeric covered with an individual coloured translucent material.

FIGS. 6 and 7 illustrate another type of display which can incorporate the principles of the present invention. In this alternative unit, an optical display is formed into the shape of a wreath 66 which will emit various light colours from the protrusions 68 set at the upper mid-center of the wreath along the entire circumference of the semi-annular shaped display. The body of the wreath 66 is constructed, preferably by two halves which form into a single structure by pins 70, which insert in grooves 72; two light sources 74 are used. This provides for the emission of light from the interior of the wreath to the exterior. The light sources 74 are high quality, long life, standard incandescent lamps inserted at the diametric extremes of the circumference.

In practice, one would manufacture the wreath either by using perforations 69 covered with translucent, transparent materials 88 or produce the wreath 66 by using only solid light conducting medium as protrusions 68 covered with various translucent material 88 to give it various coloration. The light sources 74 can be removed in the case of needed replacement by opening the door 75, which swings on a hinge 77 attached to the bottom half of the wreath 66. The light sources 74 are connected electrically via wiring 79 connected to a low voltage and current adaptor which is plugged into a 117 or 208 voltage line. The light source and motor could also be operated by a suitable battery pack.

The exterior surface of the wreath 66 is provided with a plurality of needles 96 or imitation traditional Christmas foliage to produce a natural evergreen appearance. Needles 96 or foliage material can be bonded to the exterior surface.

Figure 8:
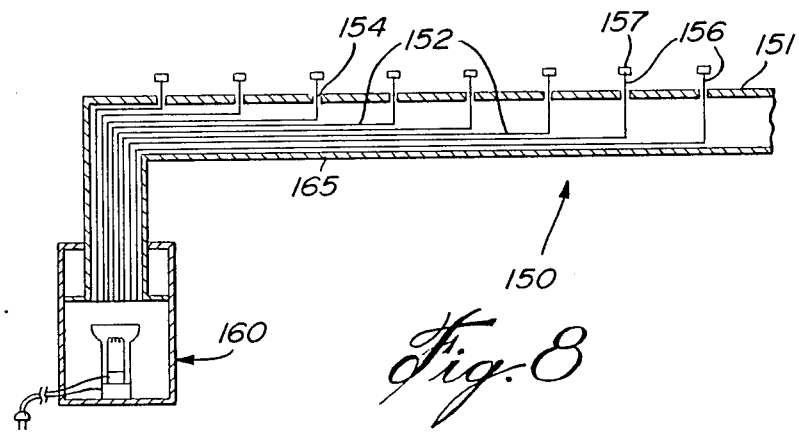
FIG. 8 is a sectional view of the outdoor illumination showing the simulated light bulbs plus a base with a light source.

Referring to the cross-sectional view of FIG. 8, this represents an alternative form. In this embodiment, an optical display is formed into the shape of an outdoor lighting display 150. The outdoor display 150 is formed by employing single or multiple individual light pipes (fibers) 152 of a variety of lengths and diameter within certain flexibility to accommodate the perforations 154 which are evenly spaced along the optical display. The perforations 154 are manufactured as part of the housing 151 which embodies the single or multiple light pipe 152. The housing 151 is preferably built of flexible, semi-flexible, or rigid plastics. The length of the individual light pipes 152 and of the evenly spaced protrusions 156 can be produced with a variety of length and diameter. The light pipes 152 exit the housing 151 through perforation 154 as a single diameter protrusion 156. The protrusions 156 are coated with a translucent material 157 to give them a colour appearance such as the colours mentioned in FIG. 12.

Referring to FIG. 8, it can be seen that the display is inserted into a base 160. Furthermore, the display 150 and the base 160 are covered by a sliding plastic cover 165 to protect the base from adverse weather conditions. The display 150 may accommodate alternate types of bases, which may contain a circular wheel with one or multiple slits, such that when coupled with the said individual light pipes may be incorporated to give the outdoor display (simulated light bulb) a single or multiple light chasing effect of a plurality of individual colour. The bases may be of such types seen in FIGS. 9 and 10.

Figure 9:
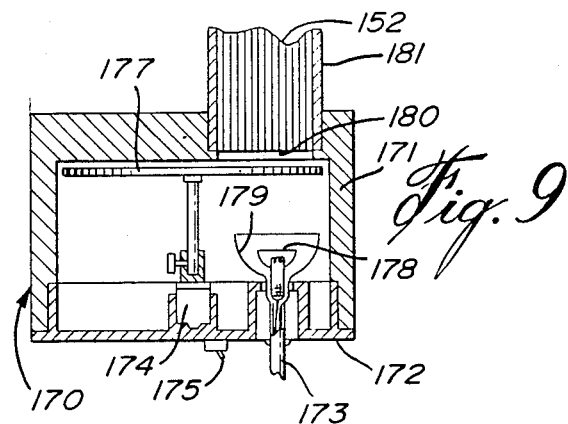
FIGS. 9 and 10 are enlarged sectional views of an optional form of base for FIGS. 11, 12 and 13, displaying electrical connection of motor, colour wheel or chaser wheel and light source with a chaser wheel and light source with a snap on for the fiber. It also shows the ease of access to the motor, light source and wheels.

Referring to FIG. 9, the base 170 is composed of molded plastics, comprised of two sections, top half 171 and bottom half 172. The bottom half contains the electrical inlet 173, motor 174 for which a connection is not shown, motor switch 175 or motor switch with variable speed, also not shown, to provide slow, medium, or fast speed of the colour wheel 177, light source 178 with a reflector 179. A contact rotating wheel as described in FIG. 3 may be incorporated in this base 170 to give an on-off lighting effect. The contact wheel is not required if on-off light bulbs are used. The top half 171 allows for the individual fibers (light pipes) 152 to be inserted into attachment hole 180 such that the individual light pipes 152 are held by tight fit or the snap-on connection may be used. The light pipes 152, the top half 171 and bottom half 172, are covered by a plastic sheath 181 (similar to that of the plastic cover 165 in FIG. 8), to protect the base from adverse weather conditions. The colour wheel 177 and motor 174 may be omitted if the protrusions are manufactured and coated with a translucent material cover 157 as is shown in FIG. 8.

Figure 10:
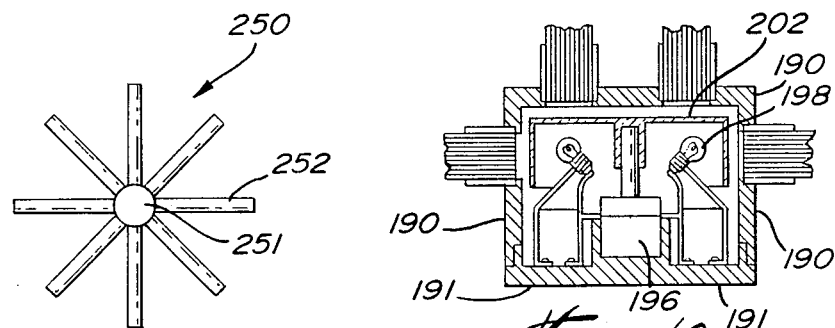

FIG. 10 is an alternative base which can house more than one embodiment of the display of FIG. 8. The base may be used during the Christmas season or may be used in business sectors as window lighting displays. The base in FIG. 10 is comprised of two sections, top half 190 and bottom half 191. The bottom half contains an electrical inlet through an adaptor which are not shown, motor 196, two light sources 198 for multiple light display plug-in, switch 200 also not shown, a rotatable colour wheel 202 or combination of colour wheel 202 and perforated wheel 202, not shown, contact rotating wheel 202, also not shown, to provide an on-off lighting effect.

The contact rotating wheel may be omitted if the light sources 198 are replaced with light sources having on-off features built into them. The top half 190 may have one or more holes to allow for either a cast solid conducting rod 212 or individual fibers (light pipes) to be inserted into the hole 204.

Figure 11:
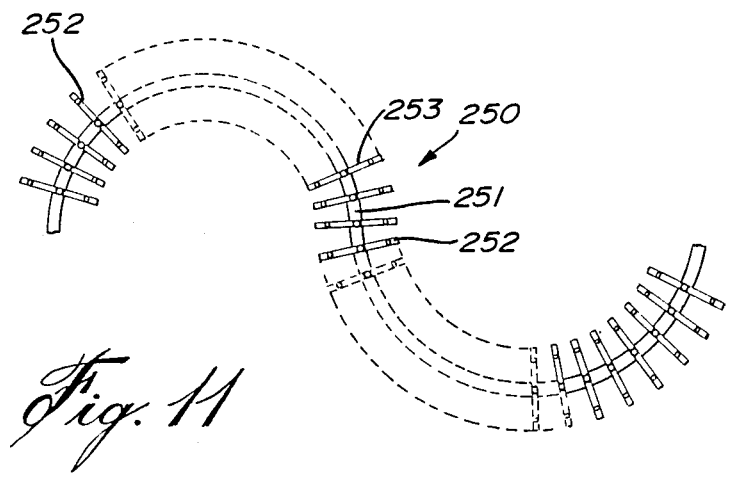
FIG. 11 is a transverse sectional view of an optical display in the form of a light series, illustrating a stem with protrusions made of a light conducting medium.

Referring to FIG. 11, this represents an alternative optical display of the present invention in the form of a long flexible general purpose light series display 250. The display 250 may be used to decorate an indoor Christmas tree by wrap around, artificial plants or may be used as general indoor decorations. The display 250 may also be used outdoors, as a decorative light display for decorating natural trees. During holiday seasons, the display 250 may also be arranged so as to outline the shape of the Christmas tree. The alternative optical display of the present invention consists of a long flexible embodiment cast from light conducting medium into the shape of a long stem 251. The stem 251 contains many protrusions 252 cast as part of the same embodiment which protrude along the length and circumference of the stem 251. As in the previous embodiments, to give the viewer a single or multi-colour appearance, the stem 251 and protrusions 252 are covered with a transparent or translucent material 253. Such colours can be red, yellow, green, blue, etc., or the colours used as a combination thereof.

Figure 12:
FIG. 12 is a cross-sectional view of FIG. 19 also illustrating the stem and orientation of protrusions around the stem.

FIG. 12 is a cross-sectional view of the display in FIG. 11, depicting the arrangement of the core 251 and the protrusions 252. The protrusions 252 may be cast of any practical length depending on its use and need. The display may be fitted as a snap-on on a base which contains a light source. The base may be similar to that described in FIG. 8 without any colour wheel or chasing effects. Furthermore, if the display is to be used as a decoration for the Christmas tree in FIGS. 1 or 2, the display may be plugged into accessory holes on the trunk 12 for a light source.

We claim:

1. An illuminated decorative display in the form of a Christmas tree, including a structural housing with an enclosure wall in the form of a hollow tubular trunk of the tree, a light source extending throughout the hollow trunk, in the form of an elongated tubular light, solid light conducting members made of cast organic material each having a stem portion and branch portions cast and extending from the stem portion in such a manner that the stem portion and branch portions transmit visible light to the ends of the branch portions and the stem portion, the light conducting members forming the tree branches of the Christmas tree with the one end of the tree branch penetrating a discrete opening in the hollow tubular trunk and being in close proximity to the light source and the branches of the light conducting member being in the form of evergreen needles extending from the stem of the tree branch such that light is emitted at the end of the stem and at the end of the needles of the tree branch.

2. A Christmas tree as defined in claim 1, wherein one end of the tubular light is fitted within an electrical conducting socket, and the socket is mounted for rotation being directly connected to a motor in a base of the Christmas tree, and the other end of the tubular light is in contact with an electrical contact cover at the end of the trunk.

3. A Christmas tree as defined in claim 2, wherein the electrical connection for the light is supplied by a rotary segmented conductor disc which provides intermittent electrical contact to the socket for intermittently lighting the Christmas tree.

4. A Christmas tree as defined in claim 2, wherein the tree branch formed by the light conducting material is molded in one piece with a stem and a plurality of branches in the form of evergreen needles extending radially from the stem, the stem and branches in the form of evergreen needles being capable of conducting light to the ends thereof.

5. An illuminated decorative display comprising a structural housing with an enclosure wall in the form of an annular wreath having a hollow tubular housing defining a ring, a chord-like tube extending across the ring with the ends of the chord-like tube in communication with the annular tubular housing, at least one light source provided in the tubular housing adjacent the chord-like tube, a solid light conducting member formed of a cast organic material formed as a stem portion and branch portions such that the stem portion and branch portions transmit visible light to the ends of the branch portions and the stem portion, one end of the light conducting stem being in close proximity to the light source, and the stem thereof extending axially of the chord-like tube and the branches extending therefrom coincident with apertures provided in the chord-like tube for emitting light therefrom.

6. An illuminating display device in the form of an outdoor-indoor series light comprising an elongated tubular structural housing, a light source provided at one end of the tubular housing, and light pipes extending within the housing from the light source with one end of the light pipes being in close light conducting proximity to the light source, a plurality of discrete openings in the housing, and the individual light pipes being bent to pass through said discrete openings in the housing to thereby provide a series light display device.

7. An illuminating device as defined in claim 6, wherein the tubular housings are in the form of straight cylindrical tubes connected to light source housings, and a plurality of such tubes may be provided in series interrupted by light source housings.

8. An illumination display as defined in claim 6, wherein the solid light conducting members are in the form of light pipes and the light source is contained within an enclosed housing having means for receiving the light pipes, the light source including means for providing intermittent or colour changes is provided within the light source housing such that sequential intermittent or light colour changes can be provided by means of a plurality of light pipes being sequentially exposed to the intermittent light means or colour changes.

9. A display as defined in claim 8, wherein an opaque wheel driven by a motor is interposed between the ends of the light pipes and the light source and openings are provided in the opaque wheel for providing sequential intermittent effect to the light pipes.

10. An illuminated decorative display as defined in claim 8, wherein a colour wheel is provided between the light source and the ends of the light pipes driven by a motor such that sequential light colour changes are provided to the light pipes.

11. An illuminated decorative display as defined in claim 8, wherein the light source housing is provided with a plurality of sockets for receiving the ends of pluralities of light pipes.

* * * * *